United States Patent [19]
Lee et al.

[11] Patent Number: 5,774,544
[45] Date of Patent: Jun. 30, 1998

[54] METHOD AN APPARATUS FOR ENCRYPTING AND DECRYPTING MICROPROCESSOR SERIAL NUMBERS

[75] Inventors: Sherman Lee, Rancho Palos Verdes, Calif.; James R. MacDonald, Buda; Michael T. Wisor, Austin, both of Tex.

[73] Assignee: Advanced Micro Devices, Inc., Sunnyvale, Calif.

[21] Appl. No.: 623,024

[22] Filed: Mar. 28, 1996

[51] Int. Cl.$^6$ ...................................................... H04L 9/00
[52] U.S. Cl. .................................. 380/4; 380/23; 380/25; 380/49; 380/50; 380/9
[58] Field of Search ............................ 380/4, 9, 23, 25, 380/28, 49, 50, 59

[56] References Cited

U.S. PATENT DOCUMENTS

| | | |
|---|---|---|
| 5,029,207 | 7/1991 | Gammie ................................. 380/23 X |
| 5,237,610 | 8/1993 | Gammie et al. ...................... 380/23 X |
| 5,319,705 | 6/1994 | Halter et al. . | |
| 5,602,920 | 2/1997 | Bestler et al. ............................ 380/49 |

FOREIGN PATENT DOCUMENTS 0 707 270   4/1996   European Pat. Off. .

OTHER PUBLICATIONS

Dallas Semiconductor Corp.: "Section 1: Introduction," Oct. 6, 1993, Data Book Soft Microcontroller, pp. 1–3, 07/08, 73, 77–80, 82, 229, 290–292.

Electronics, "Designer's Dream Machine," vol. 60., No. 5, Mar. 1987, New York, US, pp. 53–57.

Ferreira, R.C.: "The Smart Card: A High Security Tool in EDP,"Philips Telecommunication Review, vol. 47, No. 3, Sep. 1, 1989, pp. 1–19.

International Search Report for PCT/US 97/05117 dated 08–04–97.

AMD5$_k$Processor Technical Reference Manual, 1986 Advanced Micro Devices, Inc., pp. 3–29 through 3–31.

Primary Examiner—Bernarr E. Gregory
Attorney, Agent, or Firm—Conely, Rose & Tayon; B. Noel Kivlin

[57] ABSTRACT

A method and apparatus for encrypting and decrypting a microprocessor serial number. First and second encryption keys and a serial number are provided in microprocessor machine specific registers. The serial number is encrypted using the first key. The encrypted serial number is encrypted using the second key. The first encryption key may be encrypted along with the serial number using the second key. The double encrypted serial number is then stored in memory provided for that purpose.

13 Claims, 8 Drawing Sheets

METHOD AN APPARATUS FOR ENCRYPTING AND DECRYPTING MICROPROCESSOR SERIAL NUMBERS

FIELD OF THE INVENTION

The present invention relates to encrypting and decrypting microprocessor serial numbers and particularly to a system and method for providing two layers of encryption to microprocessor serial numbers.

Description of the Related Art

For some time, workstations, minicomputers, and mainframes have had serial numbers embedded in them which uniquely identify them. Addition of a serial number allows a manufacturer to trace a product in the field back to the original equipment manufacturer (OEM). This allows the manufacturer greater control over its product. In addition, provision of a serial number permits independent software vendors to register their products. Microprocessors and personal computers typically have not been tracked by serial number, partly due to the added expense of providing circuitry to store and/or read a serial number.

As the complexity of the microprocessors themselves has increased, however, it is becoming increasingly cost-effective to provide additional circuitry and/or process steps to provide a serial number. Moreover, a serial number may be associated with particular software. Thus, for example, software that is installed on a particular processor may read a password and thereafter be keyed to the particular microprocessor wherein an attempt to install the software on a different processor would fail. Nevertheless, standard methods of providing serial number identification in a computer system are generally expensive; in a competitive microprocessor market, it is desirable to keep such costs at a minimum. Accordingly, there is a need for an inexpensive, yet effective way of providing a serial number with a microprocessor in order to trace a product in the field back to the original equipment manufacturer (OEM).

A problem with providing a microprocessor serial number in machine readable form is that it can become accessible to unauthorized users and thus susceptible to unauthorized alteration. Accordingly, there is a need for a mechanism to prevent unauthorized access to a machine readable serial number.

Still another problem with providing a microprocessor serial number and serializing the software is that if the processor is upgraded or otherwise replaced, the software will cease to function. (Serializing software is herein defined as providing a CPU serial number to a given set of software. The software will be not able to run on a processor not having that serial number.) However, to the software, there is little difference between being loaded onto an unauthorized computer system and having an unauthorized processor provided to it. In either case, the software will be keyed to a processor that is no longer present and will not function. Accordingly, what is needed is an upgrade method whereby serialized software can detect that it is running on an unauthorized processor and in response thereto can initiate a reauthorization process. If the reauthorization process is successful, the software will function on the upgrade processor. Failure at the reauthorization process, however, will mean that the software itself is loaded onto an unauthorized system and, hence, not function.

As discussed above, it is also desirable to serialize software. To do so, however, it is desirable to provide an easy method of accessing the serial number by the software while at the same tine maintaining the serial number's inaccessibility to unauthorized changes.

SUMMARY OF THE INVENTION

Accordingly, there is provided a unique system and method for providing, maintaining and upgrading the software lock of a microprocessor. A mechanism is provided for storing a microprocessor serial number in a nonvolatile random access memory formed within the same device package as the processor. The microprocessor serial number is encrypted using a double-key encryption scheme in order to prevent unauthorized access and alteration. An encryption key is itself encoded to provide easy access to an authorized user, while preventing unauthorized reading of the serial number. Finally, there is provided a method whereby software that has been serialized to a particular processor can detect that it is running on an unauthorized processor and request reauthorization.

The present invention thereby prevents unauthorized access to or alteration of a microprocessor serial number. Thus, manufacturers can maintain greater control over their products.

Accordingly, there is provided a small, nonvolatile random access memory packaged with the CPU die to provide a storage space for the CPU serial number which can be programmed before leaving the factory. Both the CPU die and the nonvolatile RAM die reside within the cavity of the package. Connection between the two die is provided by conventional wire bonding and kept to a minimum by providing a serial interface between the RAM and the CPU.

In accordance with another aspect of the present invention, access to the nonvolatile RAM storing the CPU serial number is controlled by encryption and logic on the processor. Two small layered encryption keys are used to increase security of the mechanism. The serial number may be changed only if both keys are correct. The keys and encryption algorithm are known only to the manufacturer. Register space is provided for an 80-bit serial number and two 32-bit keys. A checksum is included in the data stored in the RAM to allow detection of errors in the transfer of the RAM data to and from the CPU.

In accordance with yet another aspect of the present invention, an upgrade method is provided whereby serialized software detects that it is running on an unauthorized processor and initiates a reauthorization process based on a reauthorization use profile. The temporary reenabling of the software is allowed if the authorization service is not available or not allowed. Limited use is provided to the user until the problem is resolved.

In accordance with still another aspect of the claimed invention, a code sequence is provided for detecting a serialized CPU, extracting the CPU serial number and providing it to applications by a standard application program interface (API).

Broadly speaking, the invention contemplates a method employing a first encryption key and a second encryption key to provide a first layer of encryption and a second layer of encryption to a microprocessor serial number. The resulting double-encrypted serial number is then stored in memory set aside for that purpose.

BRIEF DESCRIPTION OF THE DRAWING

A better understanding of the present invention can be obtained when the following detailed description of the preferred embodiment is considered in conjunction with the following drawings, in which:

FIGS. 4a, 4ba and 4c are flowcharts illustrating the write-read and unlock processes of encrypting in accordance with one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives following within the spirit and scope of the present invention, as defined by the appended claims.

DETAILED DESCRIPTION OF THE INVENTION

Figure 1A:
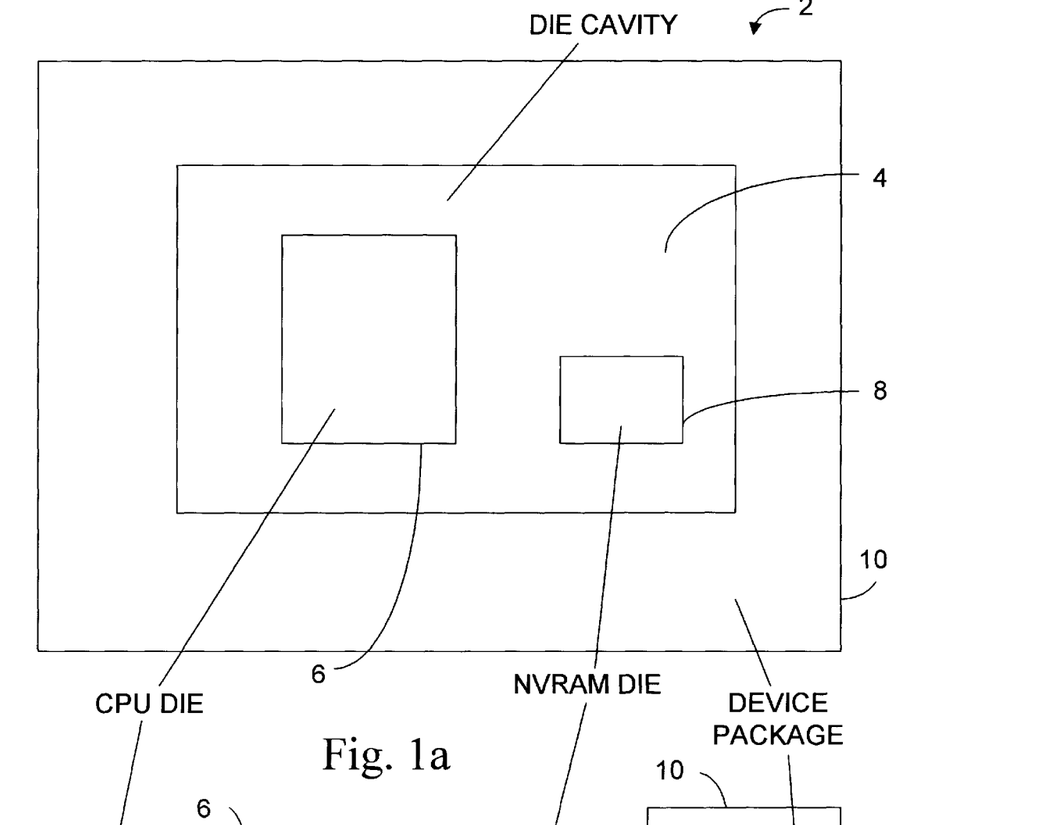
FIG. 1a and FIG. 1b are block diagrams showing a nonvolatile RAM die and CPU die sharing a device package in accordance with one embodiment of the claimed invention.
Figure 1B:
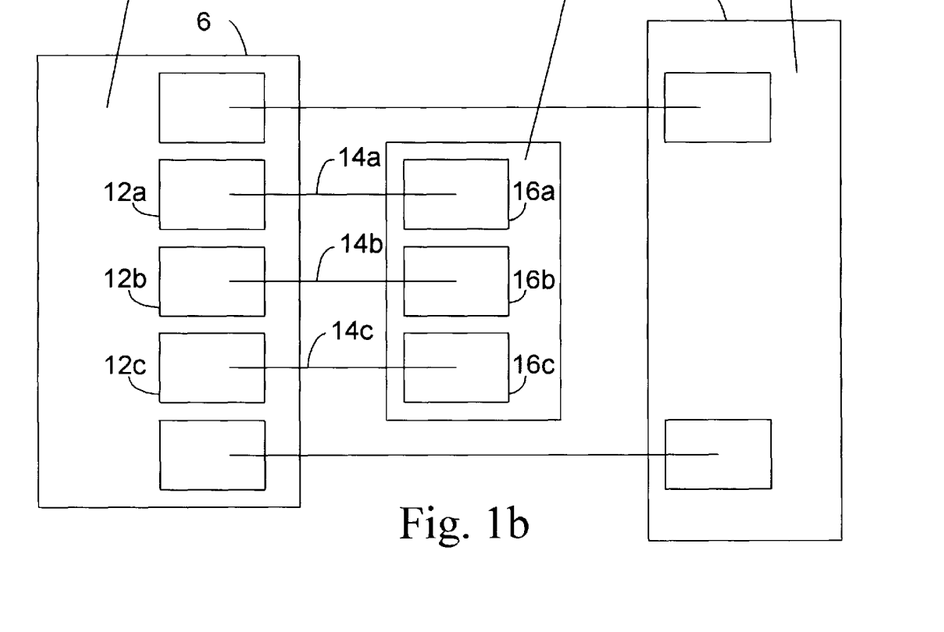

Turning now to FIG. 1a, a diagram is shown of an integrated circuit package 2 which includes central processing unit (CPU) die 6, nonvolatile random access memory (NVRAM) die 8, die cavity 4, and device package 10. In a preferred embodiment, NVRAM die 8 is formed separately from CPU die 6. Turning now to Figure 1b, NVRAM die 8 is coupled to CPU die 6 by means of signal lines 14a, 14b, 14c. Signal lines 14a, 14b, and 14c are attached to CPU die 6 and NVRAM die 8 by means of bond pads, 12a, 12b, 12c and 16a, 16b, 16c, respectively. In one embodiment, signal line 14a is a transmit line; signal line 14b is a receive line; and signal line 14c is a clock line, and form a serial interface between the NVRAM and the CPU. In an alternative embodiment, NVRAM die 8 may be connected to CPU die 6 by means of a single transmission line. In that embodiment, the CPU and NVRAM include additional circuitry to provide the serial interface. The NVRAM is programmed with the CPU serial number prior to leaving the factory.

Figure 2:
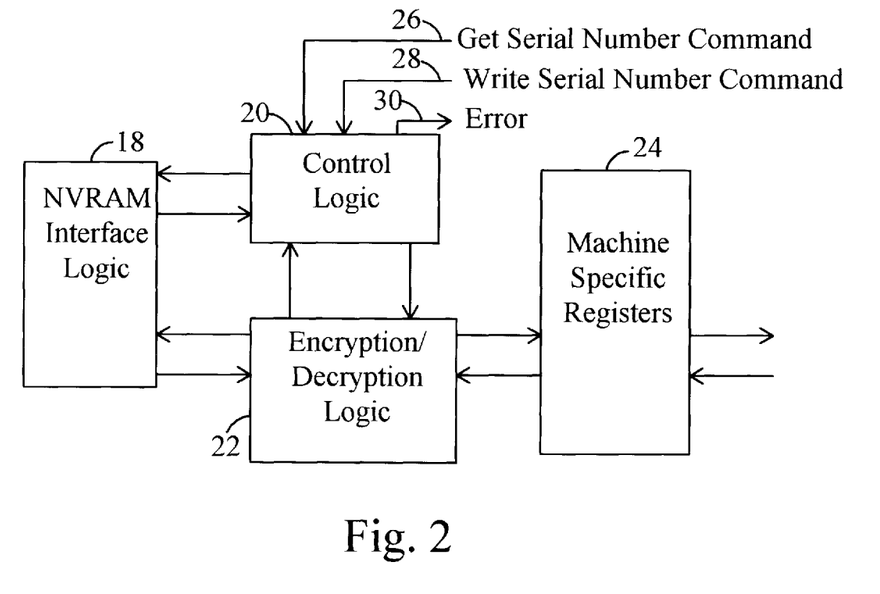
FIG. 2 is a block diagram of one embodiment of an encryption system in accordance with one embodiment of the present invention.

While providing the CPU serial number in NVRAM packaged with the CPU die provides cost advantages over, for example, permanently etching a serial number onto the die, a mechanism is needed to prevent unauthorized access to the serial number. Access to the NVRAM and hence the serial number, is controlled via encryption keys and logic on the processor. Turning now to FIG. 2, there is shown a block diagram of an exemplary encryption mechanism. The CPU includes NVRAM interface logic 18, coupled to control logic 20 and encryption/decryption logic 22. Control logic 20 and encryption/decryption logic 22 are further coupled to one another. Control logic 20 supervises the read, write serial number processes. Encryption/decryption logic 22 performs the encryption and decryption of the serial number as described below. Encryption/decryption logic 22 is also coupled to machine or model specific registers 24. Machine specific registers 24 provide the programmers interface and are of a type common in advanced x386-type processors and include command and/or status bits (e.g., unlock, read, etc.). It should be noted, however, that the use of other processors or registers is contemplated. Control logic 20 is further coupled to Get Serial Number command line 26, Write Serial Number command line 28, and Error line 30. NVRAM interface logic 18 controls transfers to and from the NVRAM.

Figure 3:
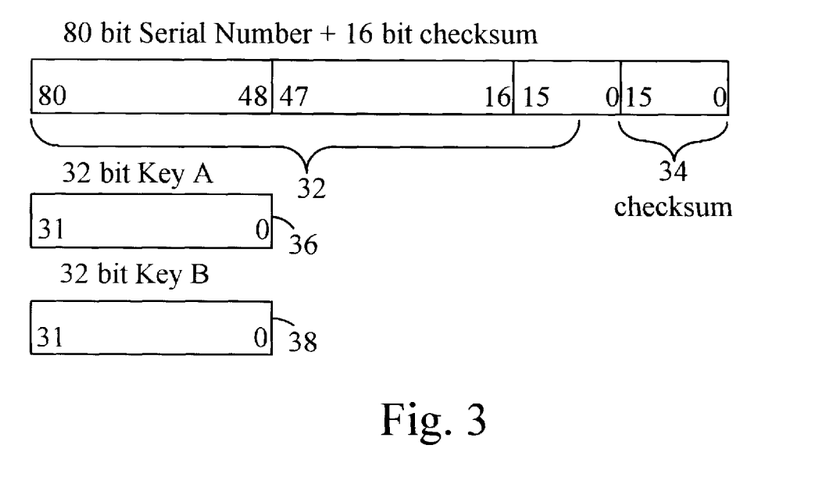
FIG. 3 is a diagram of a register set encryption system in accordance with one embodiment of the present invention.

FIG. 3 illustrates 80-bit serial number 32, 32-bit key A 36, and 32-bit key B 38. Eighty bit serial number 32, and keys 36, 38 are stored in machine specific registers 24. Sixteen bit checksum 34 is further included in the data stored in the NVRAM to allow detection of errors in the transfer of the data to and from the CPU. However, the checksum 34 is not used in the encryption process. A layered encryption method using the two keys 36, 38 is employed to increase the security of the mechanism. The serial numb er itself may be changed only if both keys 36, 38 are correct. The keys and the encryption algorithm are known only to the manufacturer.

Figure 4A:
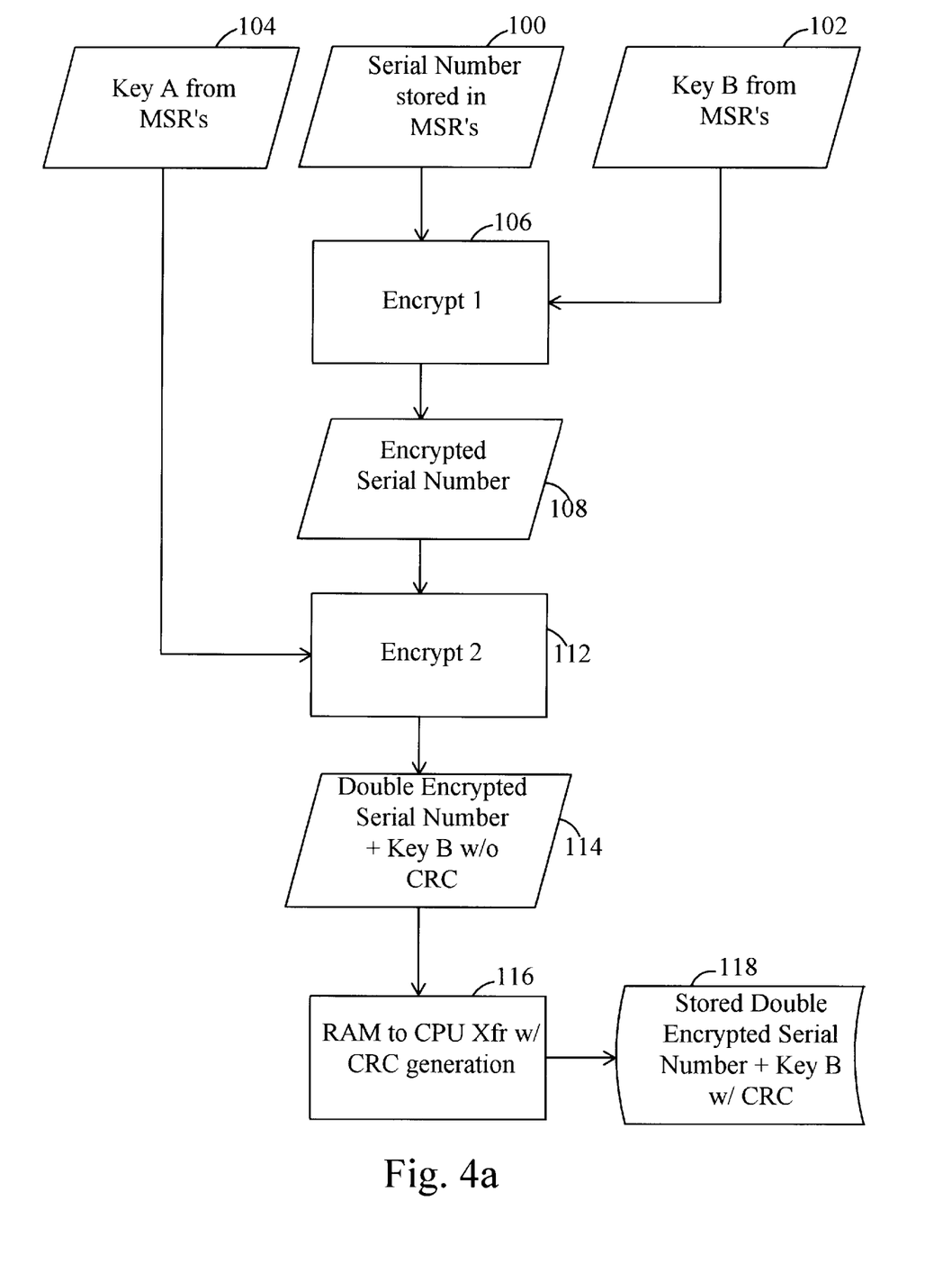

Turning now to FIG. 4a, a flow diagram of a write process used to write a new serial number is shown. Initially, serial numbers are provided in the machine specific registers (MSR) 24 (step 100), as are keys 36, 38 (step 104, step 102). Next, in step 106, key 38 is used to provide a first level of encryption to the serial number stored in the machine specific registers 24. The encrypted serial number (step 108) and key B are then further encrypted using key A in step 112. The now double-encrypted serial number are shown in step 114, with cyclical redundancy checksum (CRC). Next, in step 116, the double encrypted serial number with encrypted key B is output to the NVRAM using CRC generation. In step 118, the resulting encrypted serial number with CRC is stored.

Figure 4B:
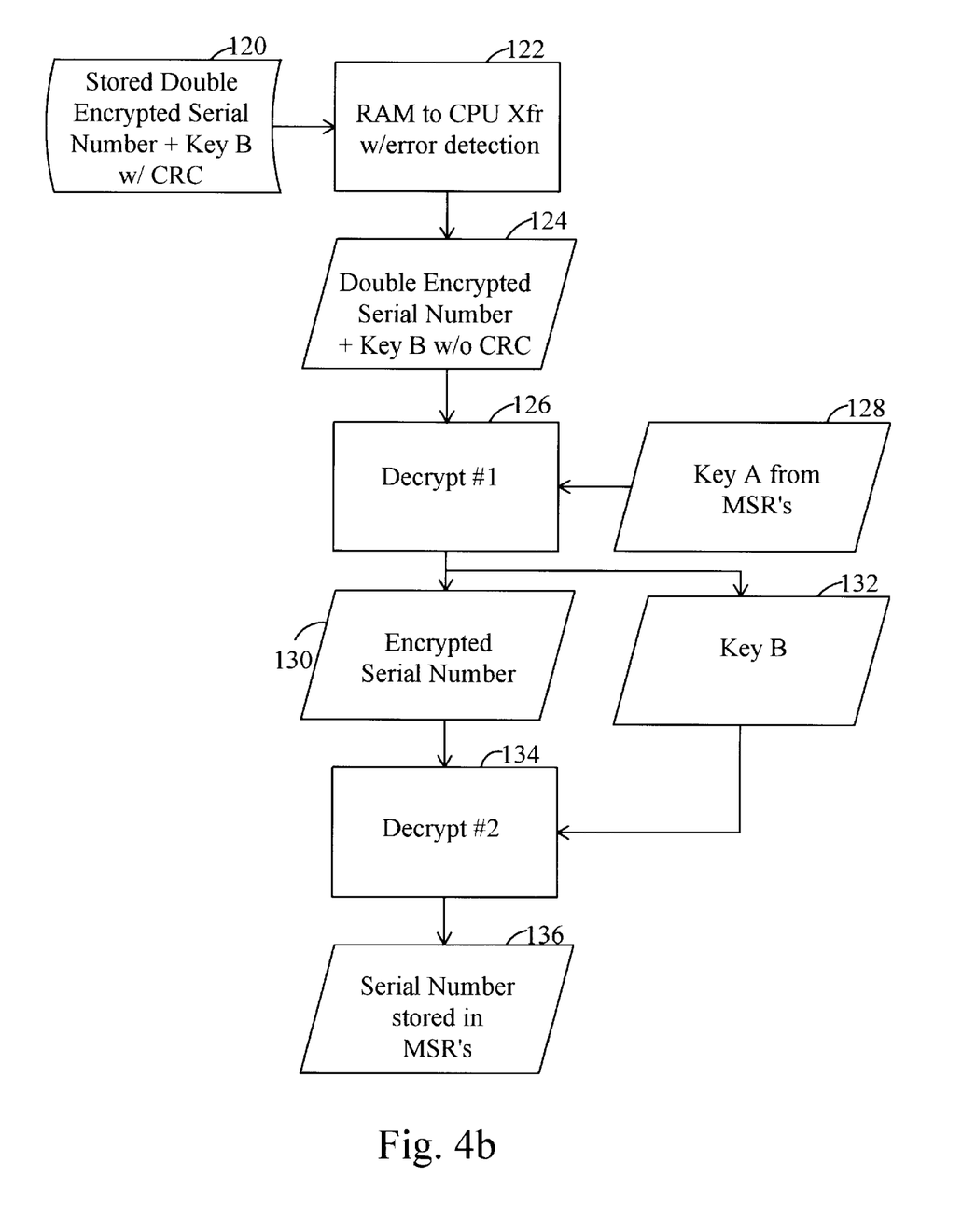
Figure 7:
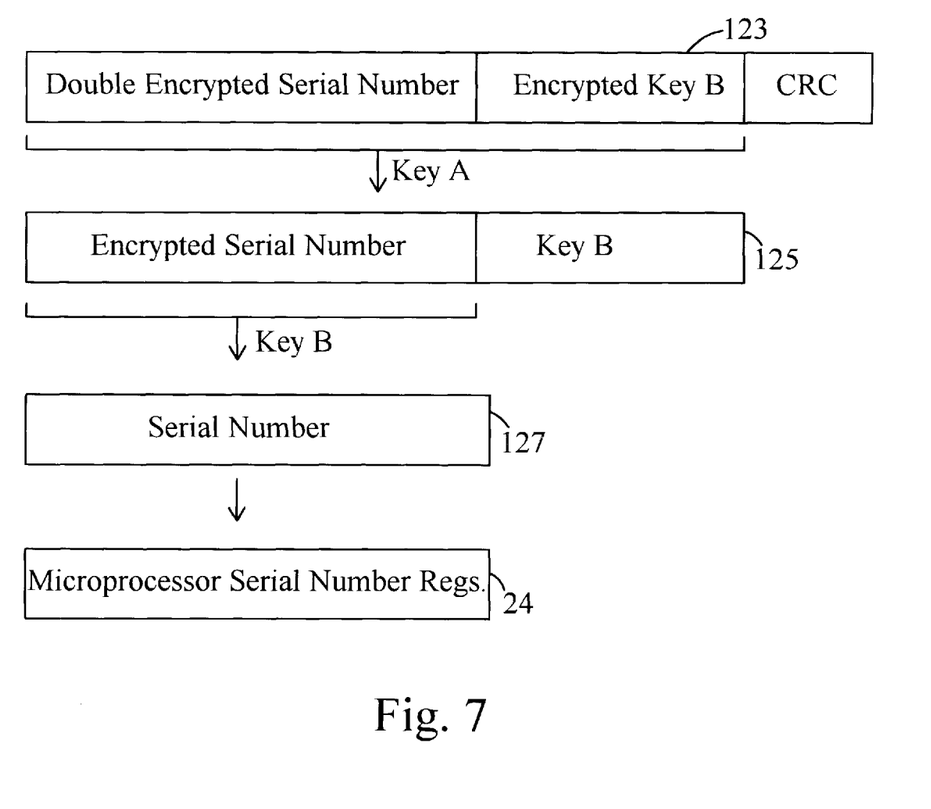
FIG. 7 is a diagram illustrating encryption in accordance with one embodiment of the present invention.

Turning now to FIG. 4b, a flow diagram of a read process is shown. The stored double-encrypted serial number and encrypted key B with CRC is initially stored (step 25 120) in the NVRAM. In step 122, an NVRAM to CPU transfer occurs using error detection. The resulting double-encrypted serial number and encrypted key B without CRC (step 124) is then decrypted in step 126 using key A from the machine specific registers (step 128). Having decrypted using key A in step 130, what remains is the encrypted serial number with key B (step 132). Key B is then used to decrypt the encrypted serial number in step 134. The resulting completely decpted serial number is then stored in the machine service registers in step 136. A schematic representation of the decryption process may be found in FIG. 7. Key A is applied to double-encrypted serial number and encrypted key B 123. The resulting encrypted serial number 125 is then decrypted using key B. The resulting serial number 27 is then stored in microprocessor serial number (or machine specific) register 24.

Figure 4C:
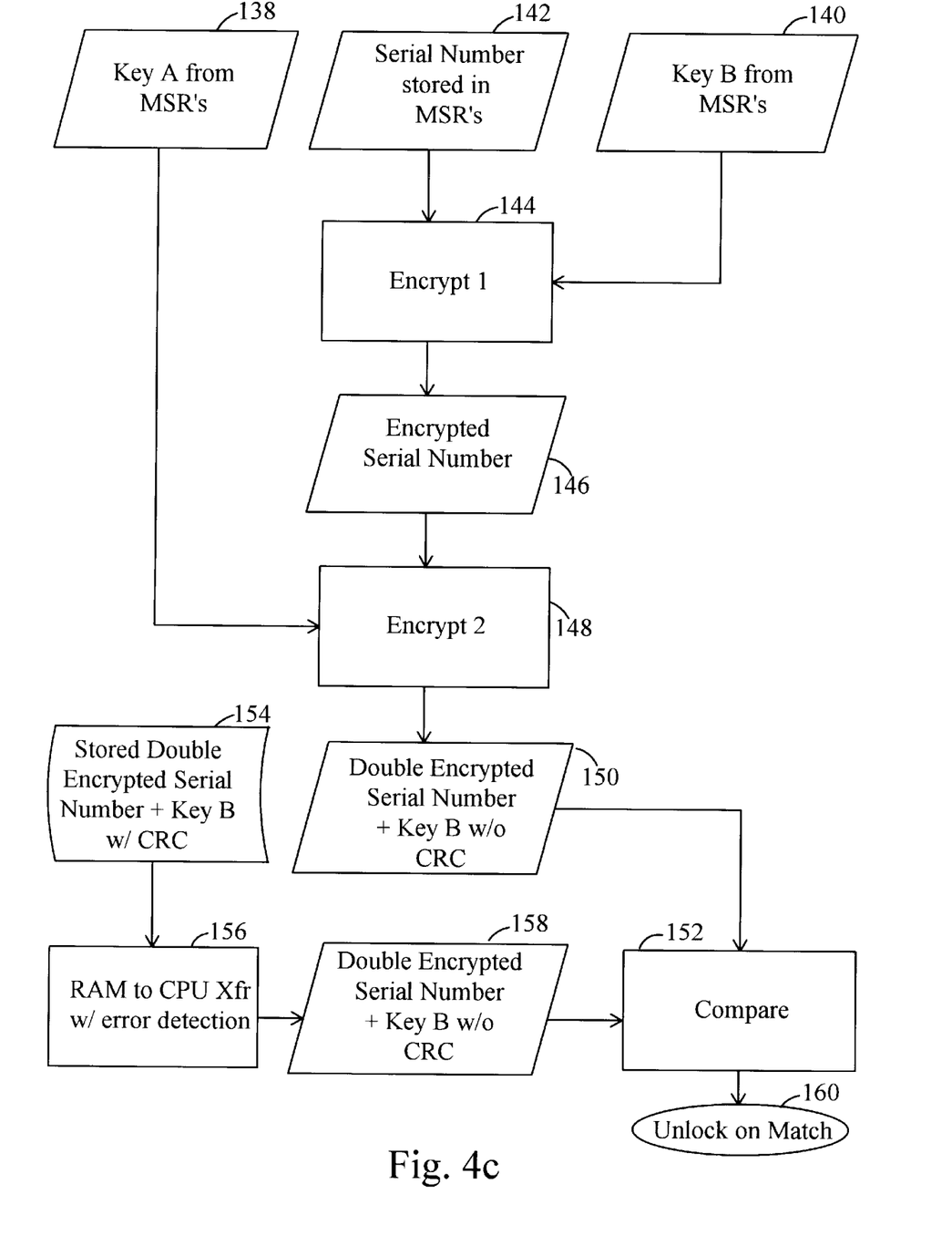

The above described read and write processes are permitted only in the event that the CPU is in an unlocked state. This can occur upon programming of a new serial number for the first time. For example, when the processor is first assembled, the NVRAM is zeroed out. The processor will detect this state and enter the unlocked state which will allow the initial serial number to be programmed by the write method described above. If, however, the device previously had a serial number within it, the unlock sequence described below must be run in order to reprogram the serial number. More particularly, turning now to FIG. 4c, in an initial state, the serial number is stored in the machine specific registers, as are keys A, B (steps 138, 140, and 142). The serial number is then encrypted using key B in step 144. The resulting encrypted serial number (step 146) and key B are further encrypted in step 148 using key A. The resulting double encrypted serial number and encrypted key B in step 150 are then input into a comparator in step 152. At the same time, the previously stored double-encrypted serial number with encrypted key B and CRC (step 154) is transferred from NVRAM to the CPU with the appropriate error detection in step 156. In step 158, the double-encrypted serial number and key B is output to the comparator (step 152). The two outputs from steps 150 and 158 are compared in comparator 152. If there is a match, the processor will enter an unlock state (step 160).

As can readily be appreciated, the processes described above are necessarily processor specific. Increasingly, however, easy upgrades of processors are available. A processor upgrade will cause software that is linked to the processor's serial number ("serialized software") to cease functioning. In accordance with one aspect of the claimed invention, a method is provided whereby serialized software can detect that it is running on an upgraded (unauthorized) processor and will initiate a reauthorization process. In a preferred embodiment, the reauthorization procedure is carried out through use of a series of application programming interfaces (API). The relevant APIs are set forth below:

---

Read_CPU_Serial_Number
This function allows the OS and application calling it to enable the reading
of the CPU serial number. In one embodiment, in order to read the serial number a 32-bit key must be entered as well as setting a read_serial_number bit in the appropriate MSR.
    Entry:
        MSR to be accessed for the serial number
        The 32 bit key
    Exit:
        CPU Serial Number
Upgrade_CPU_Serial_Number
This function will perform the automatic upgrade and re-authorization process when a CPU upgrade has occurred.
    Entry:
        New serial number
        Old serial number
    Exit:
        Authorization == 0 - not allowed
        Authorization == 1 - allow upgrade
Lock_With_New_CPU_Serial_Number
If the Upgrade_CPU returns an Authorization = 1 then the corresponding application will take the appropriate actions to change the software locking
scheme utilized.
    Entry:  New serial number
    Exit:   Success == 1 -> lock with new serial number OK
            Success == 0 -> lock with new serial number FAILED
Get_Previous_CPU_Serial_Number
This function provides a mechanism for the OS and application to retrieve what the previous CPU serial number stored into the system.
    Entry:
        nothing
    Exit:
        Success == 1 or 0
        if Success == 1
            Previous CPU serial number stored by the system
        else
            nothing

---

Figure 5:
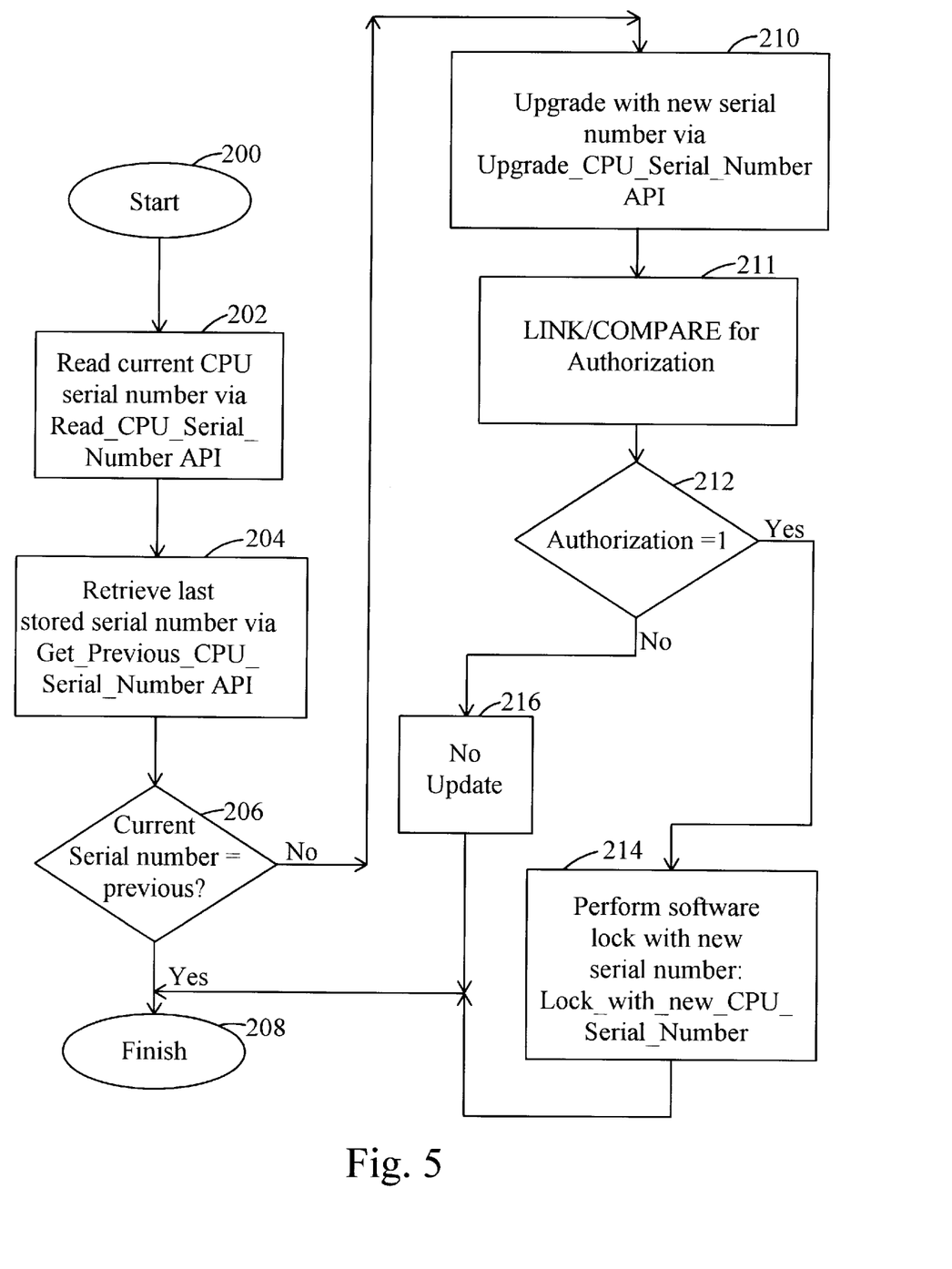
FIG. 5 is a flowchart illustrating an upgrade reauthorization system in accordance with one embodiment of the present invention.

The authorization process is detailed in FIG. 5. The procedure is initiated in step 200. At step 202, the current CPU serial number of the installed microprocessor is read via the Read_CPU_Serial_Number API command described above. In the next step, step 204, the most recently stored serial number is retrieved via the Get_Previous_CPU_Serial Number API command. If the current CPU serial number is the same as the previous CPU serial number (step 206), then the process is finished in step 208. If, however, the two are not equal, then in step 210, the Upgrade_CPU_Serial_Number API command will be initiated and authorization sought. Authorization is obtained by contacting the vendor via a telephone voice, data, Internet connection 211 or other remote connection. Based on an authorization use profile, the reenabling of the software may be allowed in step 212. If authorization is permitted, then in step 214, the software lock will be performed using the new CPU serial number and the Lock_with_new_CPU_serial_number API command (step 214). If authorization is not allowed, then in step 216, the upgrade will not be permitted. In either case, the process is completed in step 208. If the authorization service routine is not available, or authorization is denied, then one embodiment contemplates an API for allowing limited use so that the user may use this system until the problem is resolved.

One potential gap in the encryption mechanism described above is that the 32-bit key A and 32-bit key B are stored in the machine specific registers. It should be noted that, although both keys are necessary to write the serial number, only one need be provided to read it. Accordingly, the key value that is needed to read the serial number must be encoded in order to protect against users retrieving the key value. In addition, it is desirable to reduce the data size of the key from four bytes to one or two bytes in order to preserve CMOS. This aspect of the claimed invention is best described in reference to FIG. 6 as well as the APIs described below:

---

Initialize_Key
This function can only be initiated by the systems manufacturer. The purpose of this function is to facilitate the storage of the 32-bit
key value into the CMOS. This function will encode the key and store into CMOS.
    Entry:
        32-bit Key value
        CMOS index for storage of the encoded value
    Exit:
        Nothing
Encode_And_Store_Key
This function will be called by the Initialize_Key function. This function will encode the key and store it in the system CMOS. The key will not be 100% protected but will prevent the normal users from decoding the key information from system CMOS memory.
    Entry:
        32-bit Key value
        CMOS index for storage of the encoded value
    Exit:
        Nothing
Decode_Key
This function will retrieve the encoded key value from CMOS and decode it for use
    Entry:
        CMOS index for stored encoded key value
    Exit:
        32-bit Key value
The following diagram illustrates the system software access and
    control of the serial number and key.

---

Figure 6:
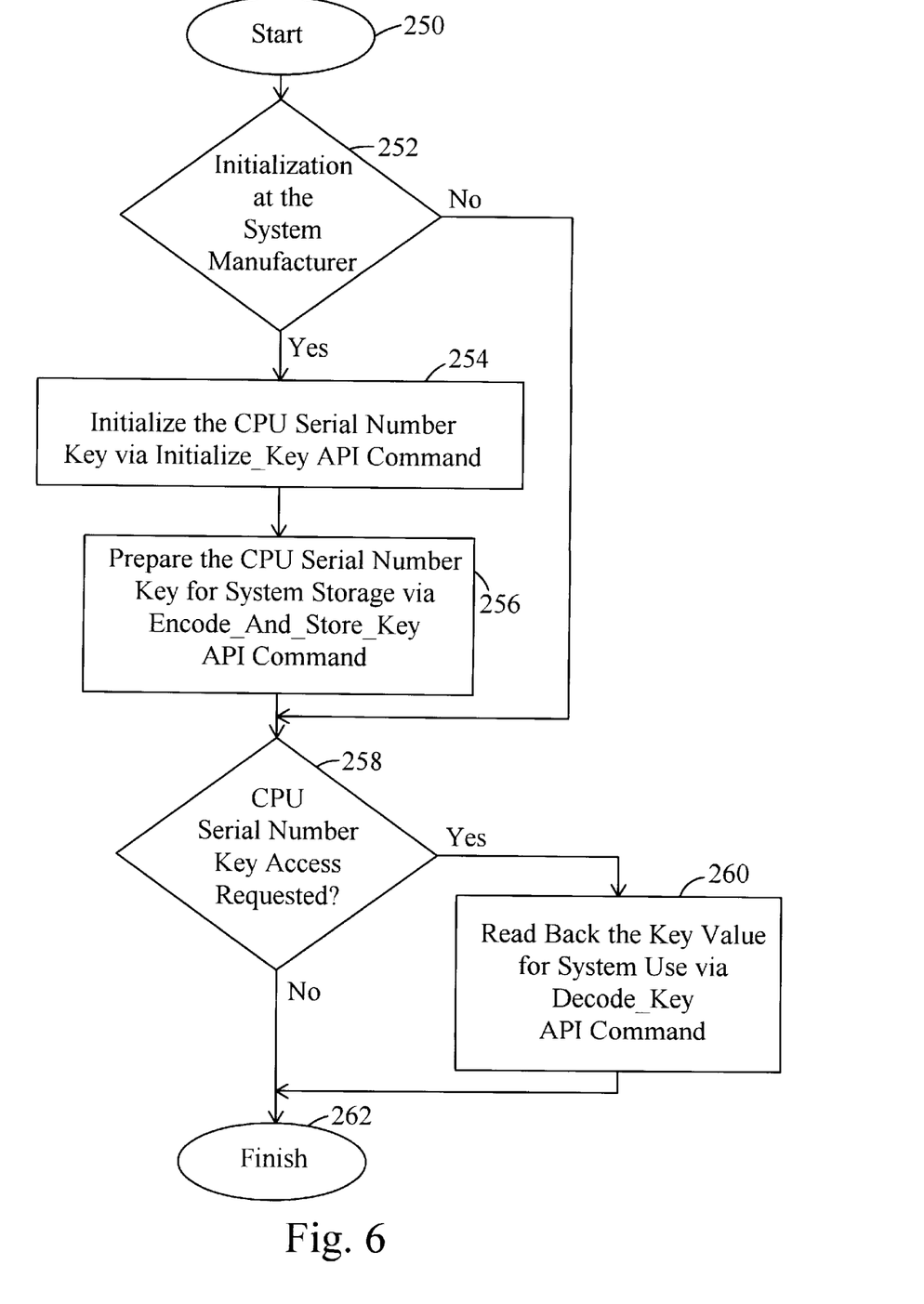
FIG. 6 is a flowchart illustrating accessing the serial number is accordance with one embodiment of the present invention.

More particularly, with reference to FIG. 6, coding the serial number key begins at step 250. If the systems manufacture has initialized the key (step 252), then the Initialize_Key API command will be asserted (step 254), in order to initialize the serial number key. Upon initialization, the CPU serial number key is prepared for system storage (step 256) via the Encode_and_Store_Key API command. Among other things, the Encode_and_Store_Key API command encode the key. For example, the function may provide a summation of the key bytes and store them in system CMOS or a more complex encoding. If key access is not requested (step 258), then the process is completed (step 252). If, however, the key number access is requested, then the key value is read back for system use (step 260) using the Decode_Key API command. Once the key value has been retrieved, reading the serial number may proceed as described above. While the above system and method will not provide complete protection against unauthorized access to the key or serial number, the casual user will not be able to gain unauthorized access.

The invention described in the above-detailed description is not intended to be limited to the specific form set forth herein, but on the contrary, it is intended to cover such alternatives, modifications, and equivalents as can reasonably be included within the spirit and scope of the invention as defined by the appended claims.

We claim:

1. (amended) A method of associating a serial number with a microprocessor, comprising:

writing a first encryption key, a second encryption key, and a serial number to a register in a microprocessor;

accessing said register for said first encryption key, said second encryption key, and said serial number;

encrypting said serial number using said first encryption key to obtain an encrypted serial number;

encrypting said encrypted serial number using said second encryption key to obtain a double-encrypted serial number; and storing said double-encrypted serial number in a nonvolatile random access memory.

2. (amended) The method of claim 1 wherein said storing step includes generating and storing a cyclical redundancy checksum.

3. A computer system for encrypting a microprocessor serial number comprising:

a central processing unit including at least one register for storing at least one encryption key and an unencrypted microprocessor serial number;

a memory unit coupled to said central processing unit for storing an encrypted microprocessor serial number;

encryption/decryption circuitry coupled to said at least one register and said memory unit for encrypting said unencrypted microprocessor serial number using said at least one encryption key; and interface circuitry coupled to said encryption/decryption circuitry and said memory unit for transferring said encrypted microprocessor serial number to said memory unit.

4. (amended) The computer system of claim 3 wherein said memory unit is a nonvolatile random access memory.

5. (amended) The computer system of claim 3, wherein said at least one register stores a first encryption key and a second encryption key.

6. (amended) The computer system of claim 3 wherein said encryption/decryption circuitry performs a first layer of encryption and performs a second layer of encryption using said first encryption key and said second encryption key.

7. (amended) The computer system of claim 3 wherein said at least one register is a machine specific register.

8. (amended) A method of unlocking access to a microprocessor serial number, comprising:

writing a first encryption key, a second encryption key, and a first serial number to a register in a microprocessor;

writing a second, double-encrypted serial number in a memory unit accessible to said microprocessor;

accessing said register for said first encryption key, said second encryption key, and said first serial number;

encrypting said first serial number using said first encryption key to obtain an encrypted serial number;

encrypting said encrypted serial number using said second encryption key to obtain a second double-encrypted serial number;

comparing said first double-encrypted serial number and said second double-encrypted serial number; and entering an unlocked state wherein the microprocessor serial number is accessible if said first double-encrypted serial number and said second double encrypted serial number are the same.

9. A method for enabling a software program to execute on only a single microprocessor, wherein the method comprises:

storing a double-encrypted serial number with an encrypted first key in a processor's nonvolatile memory;

storing an encoded second key in a system-level nonvolatile memory; and configuring the software program to:

perform a first API call to decode and retrieve the second key;

perform a second API call with the second key and an address of a machinespecific serial number register to decode the double-encrypted serial number to retrieve a decrypted serial number;

compare the decrypted serial number to a previously stored serial number; and proceed with execution if the decrypted serial number matches the previously stored serial number.

10. The method of claim 9, wherein the configuring step further comprises configuring the software program to:

request authorization if the decrypted serial number does not match the previously stored serial number; and store the decrypted serial number as the previously stored serial number and proceed with execution if authorization is received.

11. The method of claim 9, wherein the second API call comprises:

writing the second key to a second machine specific register;

transferring the double-encrypted serial number with the encrypted first key from the processor's nonvolatile memory to a third machine specific register;

decrypting the double-encrypted serial number and the encrypted first key using the second key to produce an encrypted serial number and a first key; and decrypting the encrypted serial number using the first key to produce the decrypted serial number.

12. The method of claim 9, wherein the step of storing the double-encrypted serial number with the encrypted first key comprises:

entering an unlocked state;

writing a first key to a first machine specific register;

writing the second key to a second machine specific register;

writing a serial number to a third machine specific register; encrypting the serial number using the first key and concatenating the first key to produce an encrypted serial number;

encrypting the encrypted serial number using the second key to produce the double encrypted serial number which includes the encrypted first key;

generating a redundancy checksum for the double-encrypted serial number;

appending the redundancy checksum to the double-encrypted serial number;

transferring the double-encrypted serial number with the redundancy checksum to the processor's nonvolatile memory.

13. The method of claim 12, wherein the step of entering an unlocked state comprises:

writing the first key to the first machine specific register;

writing the second key to the second machine specific register;

writing the serial number to the third machine specific register;

encrypting the serial number using the first key and concatenating the first key to produce an encrypted serial number;

encrypting the encrypted serial number using the second key to produce a new double encrypted serial number;

retrieving the double-encrypted serial number with the redundancy checksum from the processor's nonvolatile memory;

determining that the retrieved double-encrypted serial number matches with the new double-encrypted serial number.

* * * * *